United States Patent [19]

Sollars

[11] Patent Number: 5,940,626
[45] Date of Patent: Aug. 17, 1999

[54] PROCESSOR HAVING AN INSTRUCTION SET ARCHITECTURE IMPLEMENTED WITH HIERARCHICALLY ORGANIZED PRIMITIVE OPERATIONS

[75] Inventor: Donald L. Sollars, Milpitas, Calif.

[73] Assignee: TeraGen Corporation, Sunnyvale, Calif.

[21] Appl. No.: 08/963,387

[22] Filed: Nov. 3, 1997

[51] Int. Cl.⁶ .................................. G06F 9/22; G06F 9/38
[52] U.S. Cl. ................................ 395/800.41; 395/800.42; 395/595
[58] Field of Search ................... 395/200.72, 200.3, 395/281, 391, 200.31, 800.42, 200.54, 385, 384, 200.44, 800.01, 800.13, 800.12, 80.22, 800.16, 800.41, 823, 683; 707/500, 526; 364/DIG. 1, DIG. 2; 711/163

[56] References Cited

U.S. PATENT DOCUMENTS

| | | | |
|---|---|---|---|
| 4,525,780 | 6/1985 | Bratt et al. | 711/163 |
| 5,287,490 | 2/1994 | Sites | 364/DIG. 1 |
| 5,404,469 | 4/1995 | Chung et al. | 395/397 |
| 5,430,862 | 7/1995 | Smith et al. | 395/500 |
| 5,438,668 | 8/1995 | Coon et al. | 395/380 |
| 5,568,401 | 10/1996 | Narayanaswami | 364/514 A |
| 5,574,873 | 11/1996 | Davidian | 395/376 |
| 5,574,927 | 11/1996 | Scantlin | 395/800.41 |
| 5,742,802 | 4/1998 | Harter et al. | 395/518 |

OTHER PUBLICATIONS

*Computer Architecture and Quantitative Approach*; Authors: John L. Hennessy, David A. Patterson; Morgan Kaufmann Publishers, Inc., 1990, Chapter 3, entitled "Instruction Set Design: Alternatives and Principles", pp. 89–137.

*Computer Architecture and Quantitative Approach*; Authors: John L. Hennessy, David A. Patterson; Morgan Kaufmann Publishers, Inc., 1990, Chapter 5, entitled "Basic Processor Implementation Techniques", pp. 199–248.

*Primary Examiner*—Daniel H. Pan
*Attorney, Agent, or Firm*—Blakely, Sokoloff, Taylor & Zafman, LLP

[57] ABSTRACT

A processor is provided with a datapath and control logic to control the datapath to selectively execute a number of hierarchically organized primitive operations to effectuate execution of user instruction streams constituted with instructions of the ISA. In one embodiment, primitive operations are statically organized into atomic units, which in turn are statically organized into snippets of execution threads. Selected ones of the snippets are logically associated together to form execution threads, which collectively implement the instructions of the ISA.

18 Claims, 10 Drawing Sheets

PROCESSOR HAVING AN INSTRUCTION SET ARCHITECTURE IMPLEMENTED WITH HIERARCHICALLY ORGANIZED PRIMITIVE OPERATIONS

BACKGROUND OF THE INVENTION

1. Field of the Invention

The present invention relates to the field of processors. More specifically, the present invention relates to the art of implementing instruction set architectures (ISA) on these processors and controlling the datapaths of these processors.

2. Background Information

Every processor has an ISA. The term processor as used herein is intended to include micro-controllers (MCU), digital signal processors (DSP), general purpose microprocessors, and the like, whereas the term ISA as used herein refers to the aspects of a processor that are visible to a programmer or compiler writer. The ISA of the various processors known in the art can be differentiated by the type of internal storage provided by the processor for instruction operands, the number of explicit operands named per instruction, whether instruction operands can be located outside the processor, the various operations provided, the type and size of the operands, and so forth.

Historically, implementation of an ISA is accomplished through the control logic provided to a processor to control the processor's datapath in performing arithmetic logic operations, which is typically specific for the ISA to be implemented. The term datapath as used herein is intended to be a collective reference to the processor elements employed in performing arithmetic logic operations. In the case of prior art processors, the datapath typically includes arithmetic logic unit(s) (ALU), operand register file, various control registers and so forth. The control logic is provided either through hardwired logic or microprogramming (also referred to as microcode or firmware). In the case of hardwired logic, typically one or more random control logic block are employed to generate the proper control signals to be output to control the datapath. The proper control signal to be output at a particular clock cycle is selected based on the current state of the processor, feedback from the datapath and the opcode of the next instruction to be executed. In the case of microprogramming, typically microinstructions are employed to specify the control signals for the datapath. The microinstructions are stored e.g. in a read-only-memory (ROM), and selected for output in each clock cycle, based on the current microinstruction program counter (PC). At each clock cycle, the microinstruction PC is modified based on a newly computed next microinstruction PC, the current microinstruction output (specifying in part the next microinstruction to be output), feedback from the datapath, and/or the opcode of the next instruction to be executed (also referred to as the next macroinstruction).

Some prior art successor processors, for legacy reasons, would accept complex instruction set computer (CISC) instructions of an historic ISA, and decode them into reduced instruction set computer (RISC) instructions of a new internal ISA for execution, even though the processors are designed with more modern RISC principles. Typically, the new internal ISA is designed to specifically mimic the historic ISA. The processor is provided with a decoder to handle the conversion between the two architectures, and control logic is equipped to control the datapath to specifically implement the new internal ISA. Instructions of the internal ISA are issued to the datapath using a microinstruction program counter.

These prior art approaches to implementing an ISA and controlling a processor's datapath suffer from a number of disadvantages. First and foremost, each processor is capable of executing only one ISA. Much of the control logic of a processor would have to be redesigned if the processor is to be adapted to support a different or a new ISA. Except for enhancements and extensions to an existing ISA, the industry almost never adapt a processor to support a different or a new processor, because of the amount of redesign effort would have been required. Virtually all processors supporting a new ISA are considered to be new designs. As a result, the industry is often confronted with significant conversion effort to adopt a more powerful new processor, executing a new ISA, to replace a number of less powerful older processors, executing their respective old ISA. Alternatively, the conversion effort becomes a significant roadblock to the wider acceptance or deployment of the more powerful new processor. For example, in many applications it is actually more price/performance effective to use anyone of a number of newer general purpose microprocessors, then to continue to use an older DSP in combination with an older MCU, but for the conversion cost of the legacy code.

Thus, a more effective approach to ISA implementation and controlling a processor's datapath without some of the prior art disadvantages is desired.

SUMMARY OF THE INVENTION

A new approach to implementing an ISA is disclosed. A processor is provided with a datapath and control logic to control the datapath to selectively execute a number of hierarchically organized primitive operations to effectuate execution of user instruction streams constituted with instructions of the ISA. In one embodiment, primitive operations are statically organized into atomic units, which in turn are statically organized into snippets of execution threads. Selected ones of the snippets are logically associated together to form execution threads, which collectively implement the instructions of the ISA.

In one embodiment, the execution of an atomic unit may be conditional, depending on whether certain associated execution conditions are met or not. The associated execution conditions are specified as a part of the snippet to which an atomic unit is a member. Additionally, the snippets are logically associated, using trap requests to the control logic.

During operation, the control logic selectively schedules the various execution threads for execution by the datapath, starting with the first snippets of the execution threads, responsive to instructions of user instruction streams. Within each execution thread, the control logic dynamically schedules additional ones of the associated snippets for successive execution, responsive to trap requests from the predecessor snippets to the control logic. For each scheduled snippet, the primitive operations of each atomic unit are issued in order to the datapath to be conditionally executed.

In one embodiment, the datapath includes an ALU and a cache memory operated to directly supply and accept operand values to and from the ALU. The ALU and the cache memory respond to the controls of the control logic as it selectively provides the atomic units of primitive operations for conditional execution.

In one embodiment, the processor is further provided with an ISA library to store the various execution threads employed to implement the instructions of an ISA. The control logic is further equipped with one or more primitive operation cache to selectively cache the implementing threads.

In one embodiment, the ISA library stores the implementing threads of multiple ISA, with the different implementing threads for the different ISA to be used in different deployments of the processor. In another embodiment, the different implementing threads for the different ISA are used for different applications interleavingly. In yet another embodiment, the different implementing threads for the different ISA are used for different applications in parallel.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
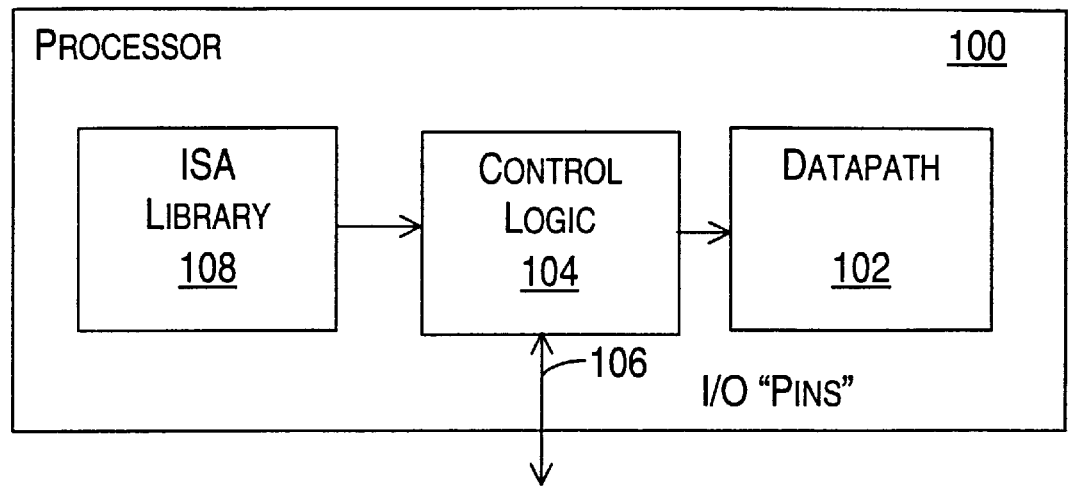
FIG. 1 illustrates one embodiment of a processor incorporated with the teachings of the present invention.

Referring now to FIG. 1, wherein a block diagram illustrating one embodiment of a processor incorporated with the teachings of the present invention is shown. For the illustrated embodiment, processor 100 includes datapath 102 and control logic 104 coupled to each other as shown. In accordance with the present invention, control logic 104 controls datapath 102 to selectively execute a number of hierarchically organized primitive operations (hereinafter POP) to effectuate execution of user instruction streams constituted with instructions of an ISA. The term POP as used herein refers to a new type of micro-level instruction. These micro-level instructions are new in the sense that they are designed to be hierarchically organized into one or more logical levels of organization to facilitate their employment to effectuate execution of instructions of an ISA. As a result of the novel manner of these new micro-level instructions or POP are hierarchically organized, only a relatively small set of POP are required to form the higher level logical units for use in effectuating execution of instructions of an ISA by datapath 102 under the control of control logic 104. Additionally, unlike prior art, execution flows from one logical unit of POP to another logical unit of POP without the need of a conventional micro-program counter.

Figure 2:
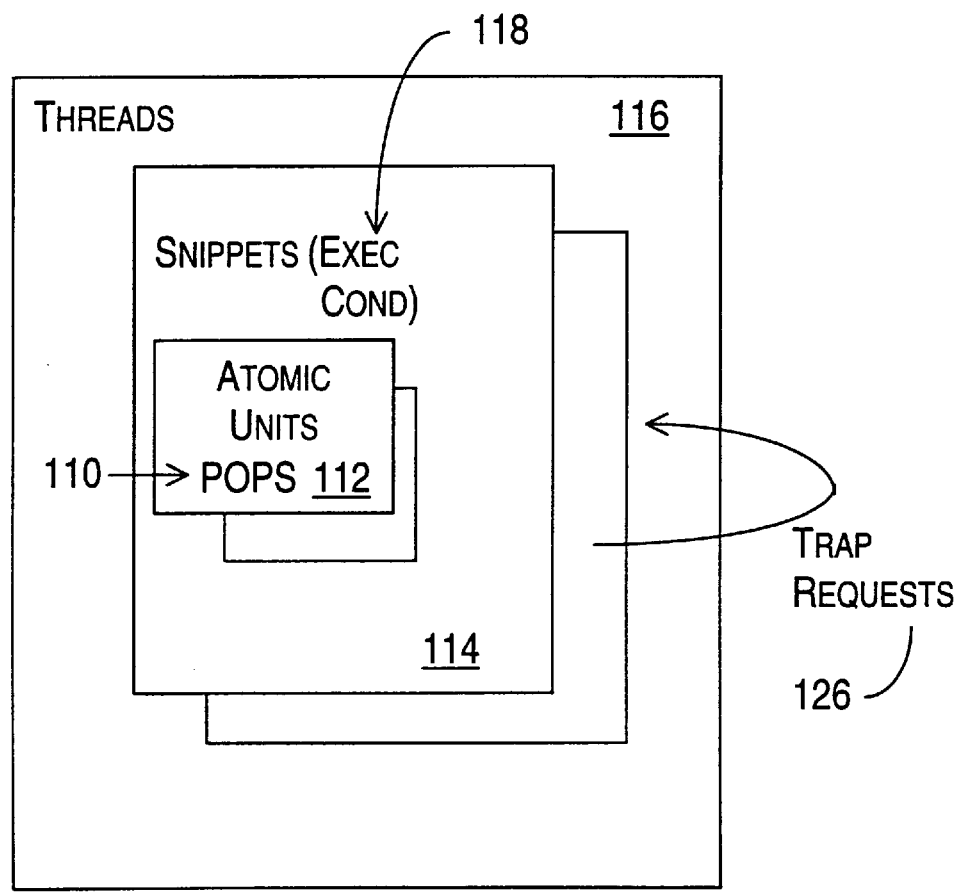
FIG. 2 illustrates one embodiment of an hierarchical organization of the POP of the present invention.

FIG. 2 illustrates one embodiment of an hierarchical organization of the POP of the present invention. As shown, selected ones of interdependent POP 110 having certain ensured order of completion are first combined to form atomic units 112. Next, selected ones of atom units 112 are then combined to form snippets 114, with each snippet 114 having one or more atomic units 112. Then, selected ones of snippets 114 are logically associated to form execution threads 116, with each execution thread 116 having one or more snippets 114. Furthermore, for the illustrated embodiment, an execution condition 118 may be specified for each atomic unit 112, governing the conditional execution of the atomic unit 112. Each execution condition 118 is expressed in terms of one or more dynamic decision variables to be examined by control logic 104, and then control datapath 102 accordingly based on the state of the specified execution condition 118, i.e. whether to cause datapath 102 to execute the atomic unit 112 or not. As will be described in more details below, for the illustrated embodiment, control logic 104 is also equipped to maintain and process the dynamic decision variables. For the illustrated embodiment, execution conditions 118 governing the execution of the corresponding atomic units 112 are specified in snippets 114 to which the atomic units 112 are members of. Additionally, snippets 118 are logically associated to form execution threads 116. For the illustrated embodiment, snippets 118 are logically associated through trap requests 126 to control logic 104 made at the end of a predecessor snippet's execution.

In one embodiment, each instruction of an ISA is implemented using an execution thread 116 (hereinafter also referred to as implementing thread, or simply, thread). For this embodiment, the POP for effectuating increment of the macro instruction program counter (PC), to be described more fully below, are organized into a singular atomic unit snippet 114, and made an integral part of each execution thread 116. In an alternate embodiment, each instruction of an ISA is implemented using at least two execution threads 116. For this embodiment, the POP for effectuating increment of the PC are organized into a common singular snippet execution thread 116. This common singular snippet execution thread 116 is executed in conjunction with the execution threads 116 of the various instructions. In any case, the various threads 116 of hierarchically organized POP collectively implement the instructions of an ISA.

Figure 3A:
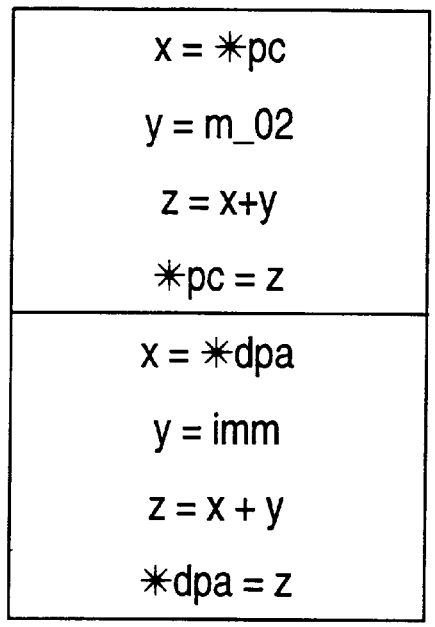
FIGS. 3a–3c illustrate various exemplary collections of POP.
Figure 3B:
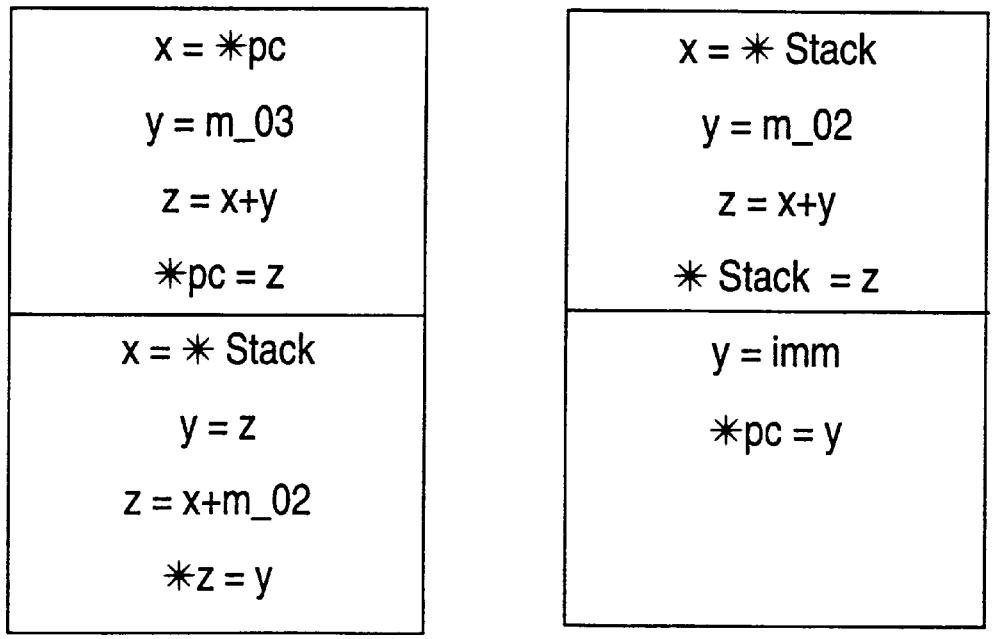
Figure 3C:
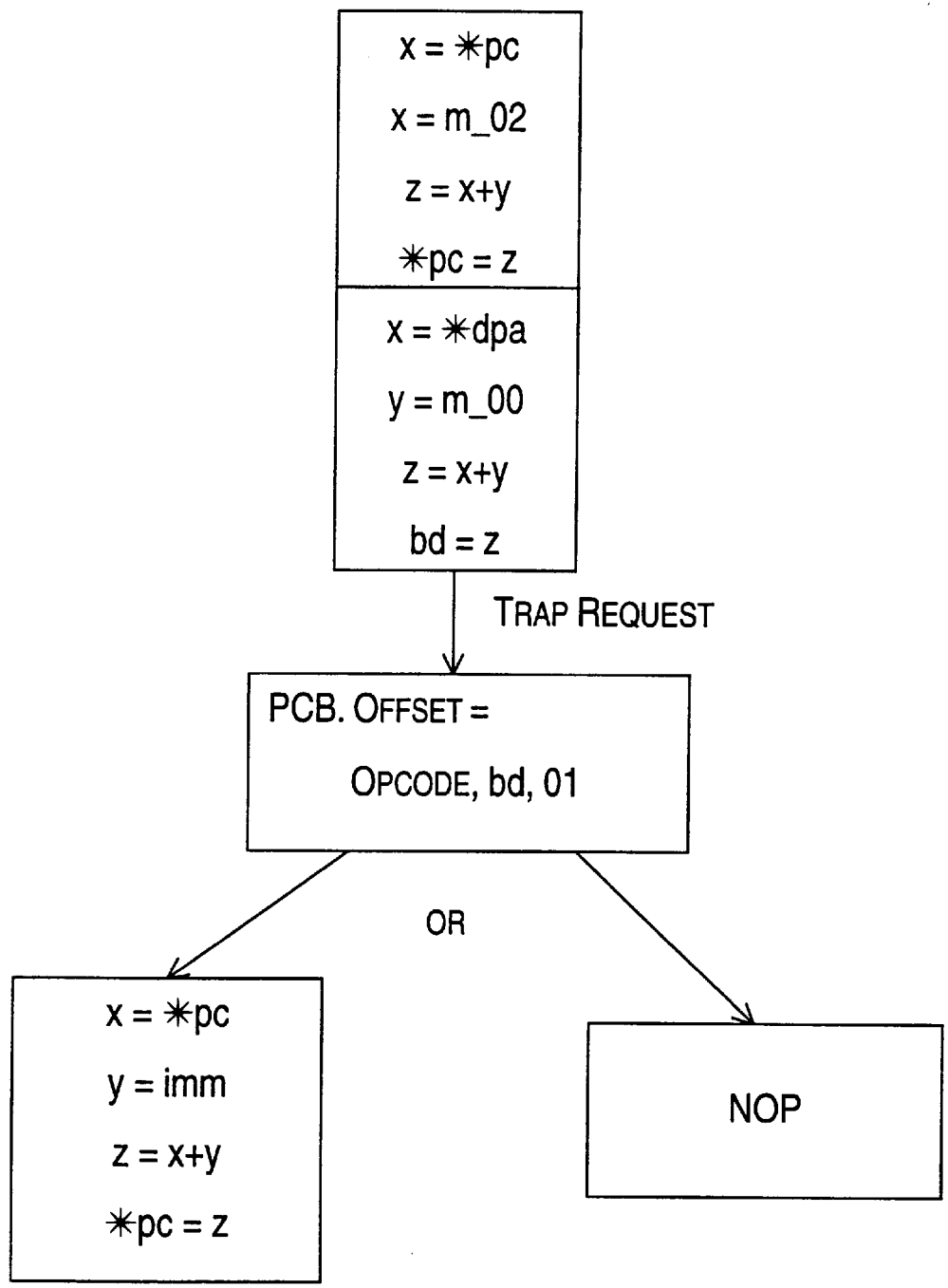

FIGS. 3a–3c illustrate how various exemplary POP are organized into atomic units, then snippets, and execution threads, to implement various exemplary instructions. The illustrations are presented in the context of an addressable operand storage medium having an x and an y output ports for outputting source operand values to two corresponding input ports of an arithmetic logic unit (ALU), and a z input port for accepting destination operand values from the output port of the ALU. Disposed between the x and y output ports and the input ports of the ALU are multiplexors to allow certain immediates or constants to be supplied to the ALU. Furthermore, the values on the x and y ports may also be by-passed to the z port. The employment of this context is merely for ease of understanding. Based on the description to follow, those skilled in the art will recognize that the present invention is not limited to the context employed.

FIG. 3a illustrates two exemplary collections of POP for implementation an exemplary ADD instruction for adding an immediate to a destination register. To implement the ADD instruction, the macro instruction pointer (pc) is incremented by two bytes (the instruction size of the exemplary ADD instruction), and an immediate extracted from the instruction is added to the content of a specified destination register (dpa). The first exemplary collection includes {x=*pc, y=m_02, z=x+y, *pc=z}, whereas the second exemplary collection includes {x=*dpa, y=imm, z=x+y, *dpa=z}.

For the first exemplary collection, POP "x=*pc" stands for outputting on the x port the data content of an addressable storage location, where the address of the addressable storage location is given by the macro instruction pointer (pc). POP "y="m_02" stands for routing a two mask (the size of the ADD instruction) to the "y" input port of the ALU. POP "z=x+y" stands for adding the two input values together, and outputting the sum for the z port. POP "*pc=z" stands for writing back the sum on port z to an addressable storage location, where the address of the addressable storage location is given by the value of PC.

Similarly, POP "x=*dpa" stands for outputting on port x the data content of an addressable storage location, where the address of the addressable storage location is given by the variable destination address (dpa). POP "y=imm" stands for routing an immediate constant extracted from the current instruction to the "y" input port of the ALU. POP "z=x+y" stands for adding the input values, and outputting the sum for port z. POP "*dpa=z" stands for writing back the sum on port z to an addressable storage location, where the address of the addressable storage location is given by the value of variable destination address (dpa).

Thus, it can be seen that when executed, the first exemplary collection of POP can effectuate increment of a PC, and the second exemplary collection of POP can effectuate adding an immediate to a destination register. For the illustrated embodiment, the orderly completion of each of these exemplary collection POP are inherently ensured due to the timing characteristics of datapath 102. As a result, in accordance with the present invention, these exemplary collections of POP are organized into two atomic units. In other words, in accordance with the present invention, interdependent POP having the ensured orderly completion characteristic are organized together as atomic units. During operation, the POP of an atomic unit are all issued to the applicable elements of datapath 102 at the same time, without the need of a micro-program counter.

Additionally, the two atomic units are further organized into a snippet, and then a singular snippet execution thread.

FIG. 3b illustrates four exemplary collections of POP for implementing a long call (LCALL) instruction to be executed in two cycles. In a LCALL instruction, the PC is incremented by three bytes (the instruction size of the exemplary LCALL instruction), to point to the first instruction to be executed upon returning from the call. The incremented PC is then saved onto a stack. Next, the stack pointer is updated, and the target address of the call extracted from the instruction is copied into the PC. The first exemplary collection includes {x=*pc, y=m_03, z=x+y, *pc=z}, whereas the second exemplary collection includes {x=*stack, y=z, z=x+m_02, and *z=y}. The third exemplary collection includes {x=*stack, y=m_02, z=x+y, and *stack=z}, whereas the fourth exemplary collection includes {y=imm, and *PC=y}.

Except for the employment of a three mask, the first exemplary collection is the same PC increment collection illustrated in FIG. 3a. For the second exemplary collection, the meaning of POP "x=*stack" is similar to the earlier described POP "x=*dpa". That is, POP "x=*stack" stands for outputting on the x port the data content of an addressable storage location, where the address of the addressable storage location is the stack pointer, given by the variable "stack". The meaning of POP "y=z" is similar to the earlier described POP "y=imm". That is, the value for port z is to be feedback to the "y" input port of the ALU. The meaning of POP "z=x+m_02" is similar to the earlier described POP "z=x+y". That is, the "x" input value is to be added to a two mask by the ALU, and the sum is to be output for the z port. The meaning of POP "*z=y" is also similar to the earlier described POP "*dpa=z". That is, POP "*z=y" stands for by-passing and writing back the y port value to an addressable storage location, where the address of the addressable storage location is given by the output value for the z port.

Thus, collectively the first and second exemplary collections of POP can be used to effectuate the first stage execution of the LCALL instruction. However, for the illustrated embodiment, the orderly completion of these POP is ensured only to the extent when they are segregated into two groups. Accordingly, they are first organized as two atomic units, and then in turn they are combined to form a snippet. During operation, once scheduled, the entire snippet will be executed, with the POP of each atomic unit being issued in order, without the need of a micro-program counter. For each atomic unit, all POP are issued to the applicable elements of datapath 102 at the same time, as described earlier.

For the third exemplary collection, the meaning of POP "x=*stack" was described earlier. POP "y=m_02" stands for providing a two mask to the "y" input of the ALU. The meaning of POP "z=x+y" was described earlier. Finally, POP "*stack=z" stands for writing back the output value for port z to an addressable storage location, where the address of the addressable storage location is the value of the stack pointer, given by the variable "stack". The POP is used to update the stack pointer with a new value. For the fourth exemplary collection, the meaning of POP "y=imm" was described earlier. POP "*pc=y" stands for by-passing and writing back the "y" input value to an addressable storage location, where the address of the addressable storage location is given by the value of PC.

Thus, collectively the third and fourth exemplary collections of POP can be used to effectuate the second stage execution of the LCALL instruction. However, for the illustrated embodiment, the orderly completion of these POP is ensured only to the extent when they are segregated into two groups. Accordingly, they too are first organized as two atomic units, and then in turn they are combined to form a snippet. During operation, once scheduled, the entire snippet will be executed, with the POP of each atomic unit being issued in order, without the need of a micro-program counter. For each atomic unit, all POP are issued to the applicable elements of datapath 102 at the same time, as described earlier.

In order to employ the two snippets together to effectuate the two stage execution of the LCALL instruction, in accordance with the present invention, the two snippets are logically associated together. For the illustrated embodiment, the two snippets are logically associated with each other using a trap request to control logic 104. In other words, in association with the definition of the first snippet, a trap to control logic 104 at the end of executing the first snippet is specified. The meanings of the various traps, i.e. in this case, the second snippet is to be scheduled for execution, are pre-defined for control logic 104. Other approaches to logically associating the snippets may be employed. Together, the two snippets form an execution thread for effectuating execution of the LCALL instruction.

FIG. 3c illustrates another five exemplary collections of POP for implementing a Jump If Accumulator Zero (JZ) instruction. The JZ instruction determines if the accumulator is zero. If so, execution continues at a target address using a displacement, based on the updated PC value, that is specified in the instruction; else execution continues with the next instruction. The first exemplary collection includes {x=*PC, y=m_02, z=x+y, and *pc=z}, whereas the second exemplary collection includes {x=*dpa, y=m_00, z=x+y, and BD=z}. The third exemplary collection includes {PCB.offset=opcode,BD,01}. The fourth exemplary collection includes {x=*PC, y=imm, z=x+y, and *pc=z}. Finally, the fifth exemplary collection includes {no-op}.

The first exemplary collection is the same PC increment collection described earlier. For the second exemplary collection, the meaning of POP "x=*dpa" and POP "z=x+y" were described earlier. POP "y=m_00" stands for routing a zero mask to the "y" input, and POP "BD=z" stands for writing back the output value for port z (in this case, the state of the zero flag of the ALU) into an addressable storage location where the value of a branch decision variable "BD" is stored.

Thus, collectively the first and second exemplary collections of POP can be used to effectuate the first stage execution of the JZ instruction. For the illustrated embodiment, the orderly completion of each of these exemplary collection of POP is also ensured. Accordingly, they are organized as two atomic units, and then combined into a snippet. During operation, the POP of each atomic unit are issued to the applicable elements of datapath 102 at the same time, without the employment of a micro-program counter.

For the third exemplary collection, POP "PCB.offset= opcode, BD, 01" stands for setting the variable PCB.offset to equal the concatenated value of "opcode, BD, 01". For this example, the PCB.offset variable holds the offset address employed to locate and dispatch the next snippet of a process for execution. The offset address in general is a function of the opcode of an instruction, plus a number of extended bits. In this case, the extended bits include the branch decision variable BD, to allow it to dynamically determine the next snippet. For the fourth exemplary collection, POP "x=*pc" stands for outputting on port x the data content of an addressable storage location, where the address of the addressable storage location is the value of PC. POP "y=imm" was described earlier. In this case, the immediate is the target displacement extracted from the instruction. The meanings of POP "z=x+y" and POP "*pc" were described earlier. The fifth exemplary collection is self-explanatory.

Thus, the fourth exemplary collection of POP can be used to effectuate the second stage execution of the JZ instruction if the branch is taken, whereas the fifth exemplary collection of POP can be used to effectuate the second stage execution of the JZ instruction if the branch is not taken. Moreover, the third exemplary collection of POP can be used to affect whether it is the fourth or the fifth exemplary collection of POP that get executed. For the illustrated embodiment, the orderly completion of each of these collections of POP is also ensured. Accordingly, they are organized as three separate atomic units, and then three singular atomic unit snippets. More importantly, the first snippet formed with the first and second exemplary collections is logically associated to the "branch taken" snippet as well as the "branch not taken"

snippet, but dynamically resolves to one or the other. The logical association is accomplished by specifying a trap request to be executed at the end of executing the first snippet. Furthermore, the trap request is defined to control logic 104 as being serviced by the snippet formed with the third exemplary collection of POP. The various snippets are organized to form the implementing thread for the JZ instruction.

Accordingly, upon executing the first snippet, BD is generated. As a result of the trap request to control logic 104 at the end of execution of the first snippet, the trap handler (i.e. the third exemplary collection) is executed, and the offset address is dynamically set to the appropriate one of either the "branch taken" or the "branch not taken" snippet. When invoked, the POP of the singular atomic unit of the "branch taken" or "branch not taken" snippet are issued to the applicable elements of datapath 102 at the same time, without the employment of a micro-program counter.

Those skilled in the art will recognize that the above illustrated exemplary POP are just a small sample of the POP of the present invention. Many more POP can be constructed to direct the various specific operations of the elements of datapath 102. Experience has shown that, when compare to a conventional reduced instruction set, for similar functionality, the set of POP required will be smaller. It can also be seen from the above described exemplary POP, the POP of the present invention are similar to prior art micro-instructions in one aspect, in that each of the POP instructs an operation to be performed by an element of datapath 102. Therefore, it is well within the ability of those skilled in the art to construct the individual POP required to manipulate the various elements of a particular embodiment of datapath 102. Accordingly, except for the exemplary POP described above, the various POP will not be individually described. Once individually constructed, with the hierarchical organization description given, those skilled in the art will be able to hierarchically organize the various POP into higher level logical constructs, and execute the hierarchically organized POP based on their organization.

Having now explained an embodiment for hierarchically organizing the POP of the present invention, we turn now to describe their relationships to other aspects of the present invention. Before doing so, it should be noted also that the above exemplary POP are executed without reference to any conventional physical registers. The source operand value is directly supplied to the ALU from an addressable storage location storing a source operand, and the resulting value is also directly stored back from the ALU into the addressable storage location. In some cases, the addressable storage locations are emulating the functions of physical registers. Such direct manner of execution, i.e. directly supplying and receiving operand values from and to addressable storage locations (without register emulation), is the subject of co-pending U.S. patent application number <to be assigned>, entitled "Cache Memory Based Instruction Execution", filed contemporaneously, and having the same inventorship as well assignee of the present invention. Register emulation is the subject of co-pending U.S. patent application number <to be inserted>, entitled "Virtual Register Sets", also filed contemporaneously, and having the same inventorship as well assignee of the present invention. Thees co-pending applications are hereby fully incorporated by reference. However, such manners of execution are merely presently preferred, the present invention may be practiced with other manners of execution, including the employment prior art physical registers.

Figure 4:
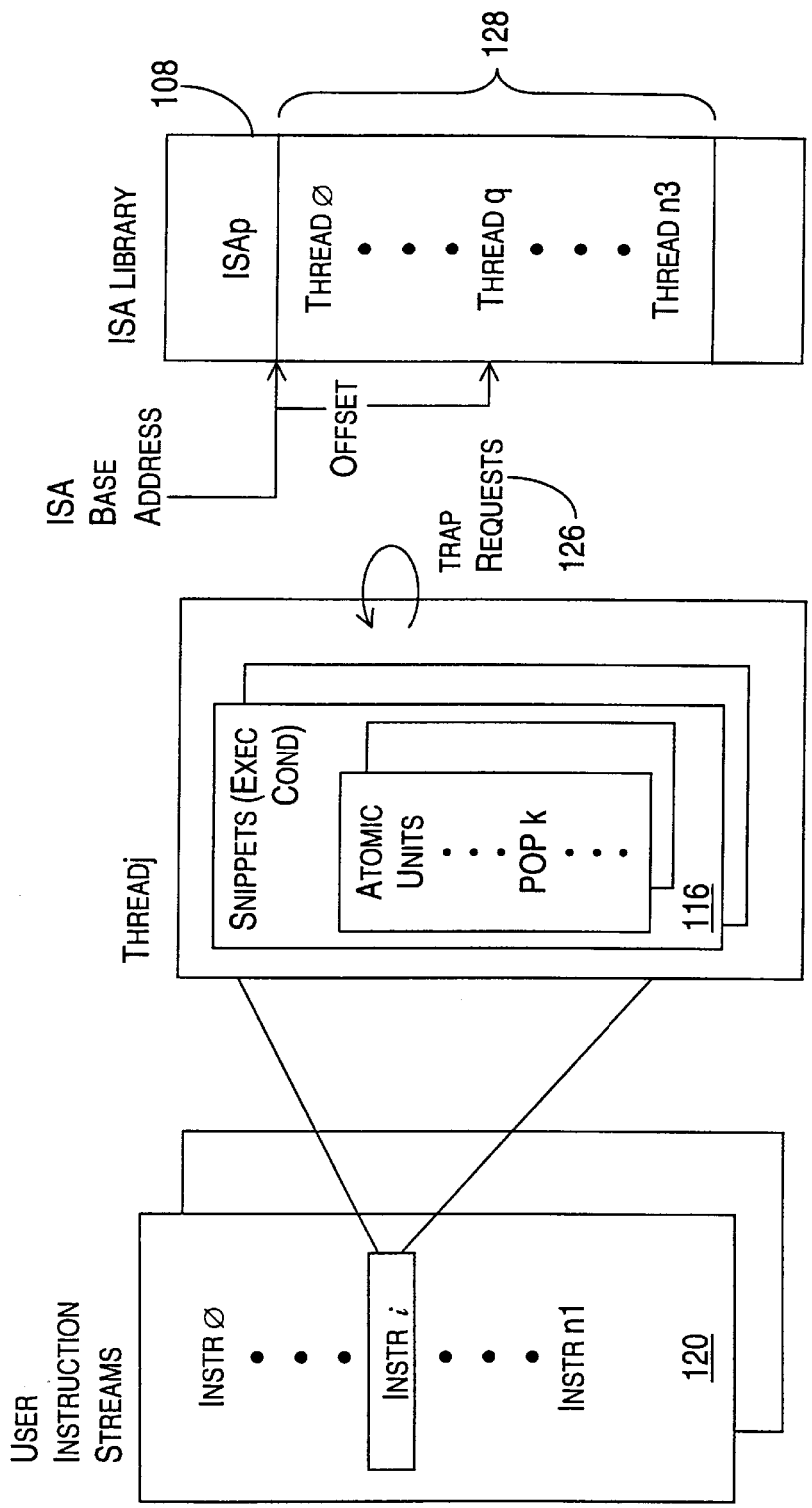
FIG. 4 illustrates the relationship between user instruction streams, instructions of an ISA, threads, and ISA library.

FIG. 4 illustrates the relationship between user instruction streams, instructions of an ISA, threads, and ISA library. As shown, an user instruction stream 120 is constituted with a number of instructions of an ISA. Examples of instructions are ADD R1, R2 and R3, and LD R4, memory address, meaning add the contents of registers R2 and R3 and place the sum of the addition in register R1, and load the content of memory address into register R4 respectively. As described earlier, each instruction is implemented with one or more threads 116 of POP. The various threads of POP 116 employed to implement a particular ISA are stored in ISA library 108. In one embodiment, control logic 104 is equipped with storage medium to pre-stage or cache the implementing threads of an ISA. For the illustrated embodiment, whether pre-staged in control logic 104 or not, a base address is used to locate the start of all the implementing threads of an ISA, and an offset address is used to locate the individual implementing threads. As described earlier, the offset address is a function of the opcode of an instruction plus a number of extended bits.

In other words, under the present invention, one or more collections of threads of POP implementing instructions of one or more ISA may be stored in ISA library 108. As a result, processor 100 may be initially deployed to effectuate execution of user instruction streams constituted with one ISA, and subsequently reconfigured to effectuate execution of user instruction streams constituted with another ISA. Alternatively, processor 100 may be deployed to effectuate execution of user instruction streams constituted with one ISA, interleaving with user instruction streams constituted with another ISA. As yet another alternate, with the proper duplication of resources, processor 100 may be deployed to effectuate execution of user instruction streams constituted with one ISA, and user instruction streams constituted with another ISA in parallel.

Figures 5, 6:
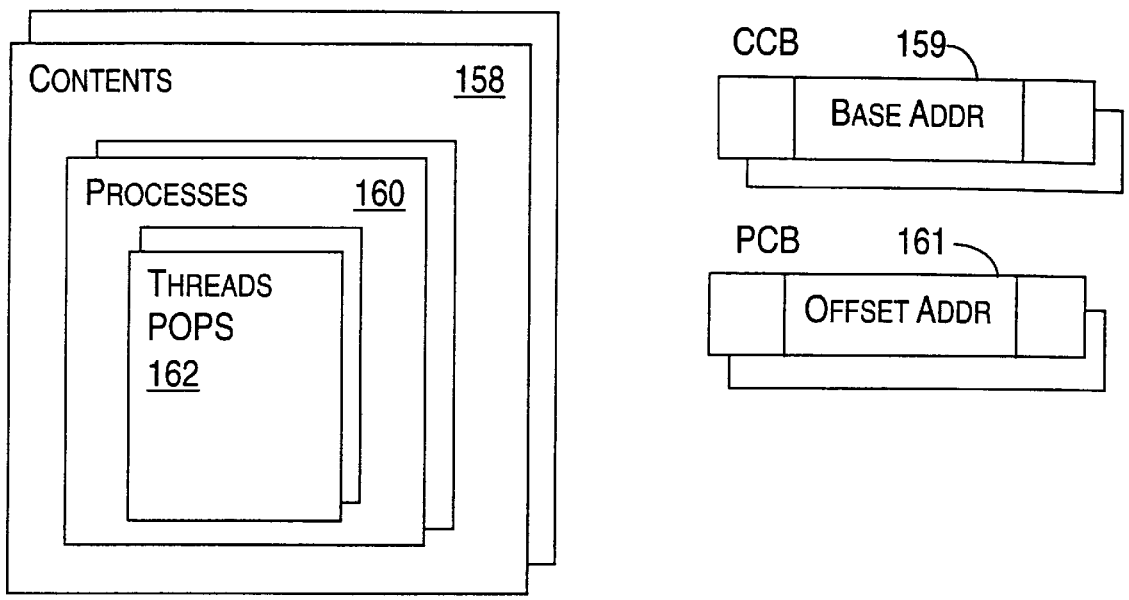
FIG. 5 illustrates the relationship between contexts, processes and threads.
FIG. 6 illustrates various exemplary collections of POP for performing dynamic decision.

FIG. 5 illustrates the relationship between contexts, processes, and threads as used herein. As shown, each context 158 includes one or more processes 160, and each process 160 in turn include one or more executing instances 162 of the earlier described threads 116, for effectuating execution of the instruction of the process 160, e.g. a user instruction stream. For the illustrated embodiment, associated with each context is a context control block (CCB) 159 storing control information about the context. These control information includes control variables known in the art. Additionally, in accordance with the present invention, the CCB includes in particular a base address control variable for denoting the base address of the collection of implementing threads 116 of an ISA stored in ISA library 108 or a pre-stage storage structure of control logic 104, if the implementing threads are pre-staged in control logic 104. Similarly, associated with each process is a process control block (PCB) 161 storing control information about the process. The control information also includes various control variables known in the art. In addition, in accordance with the present invention, PCB includes in particular an offset address control variable denoting the offset (from the above described base address for an ISA) to the start of the implementing thread of the current executing thread instance. The CCB and PCB 159 and 161 are created and maintained by control logic 104. In particular, the offset addresses are dynamically modified and restored by control logic 104 as it successively schedules the snippets of the implementing threads. The CCB and PCB 159 and 161 are created when a context and a process is first spawned. The base address is set in accordance with the ISA of a context.

Referring now back to FIG. 1, responsive to an instruction of a process, control logic 104 statically schedules a first snippet of an implementing thread for execution by datapath 102, updating the PCB as appropriate. As the POP of each atomic unit of a scheduled snippet are provided in order to datapath 102 for execution, control logic dynamically control execution of the issued POP in accordance with the specified execution condition, if any. In one embodiment, control logic 104 is equipped to process dynamic decision variables as well as determining the appropriate state transitions for a process/context. For the illustrated embodiment, the processing of dynamic decision variables as well as determining the appropriate state transitions for the processes and contexts are also accomplished using hierarchically organized POP. Furthermore, as described earlier, control logic 104 is also equipped to service various trap requests. In addition to the above described trap requests that are made upon completing execution of the snippets, to logically associate the snippets, trap requests are also made in response to values being written into certain special addressable storage locations. Typically, these are addressable storage locations employed to store various control variables. Servicing of trap requests is also accomplished using hierarchically organized POP.

An example of such addressable storage location is the location employed to function as an accumulator of the processor. A trap request is made to control logic 104 whenever a value is stored into the accumulator location, to allow a trap handler to update the state of the parity bit of the processor status word (PSW). Another example is the locations employed to store various power control bits. A trap request is made to control logic 104 whenever a value is stored into these power control bit locations, to allow a trap handler to examine whether execution is to be halted. A further example is the location employed to store a reset bit. A trap request is made to control logic 104 whenever a value is stored into the reset bit location, to allow a trap handler to determine whether to shut down all contexts.

Additionally, for the illustrated embodiment, control logic 104 is also equipped to effectuate data input/output via input/output (I/O) pins 106, and processor 100 is also provided with ISA library 108 to store the implementing threads of the various ISA. However, based on the description to follow, those skilled in the art will appreciate that the present invention may be practiced without either control logic 104 being responsible for effectuating data I/O via I/O pins 106, nor with ISA library 108 being disposed inside processor 100. The term I/O pin as used herein is intended to include I/O pins in the conventional physical sense, as well as internal I/O "pins" in the figurative sense, employed to inter-couple internal blocks of a VLSI circuit. In other words, processor 100 is an embedded internal block of a larger VLSI circuit.

ISA library 108 may be implemented with any one of a number of non-volatile storage medium known in the art, including but not limited to EPROM, EEPROM, CMOS memory, Flash memory and so forth. Both datapath 102 and control logic 104, as well as their manner of cooperation will be further described below, after the descriptions of employing hierarchically organized POP to process dynamic decision variables, determine appropriate state transitions for processes and contexts, and service trap requests.

FIG. 6 illustrates three exemplary collections of POP employed to implement an add immediate with carry instruction (ADDC_I) instruction, including an exemplary collection of POP for processing a dynamic decision variable to facilitate control logic 104 in dynamically determining whether to further increment the result of the add instruction by one. The result is to be incremented if the carry flag is set. The first exemplary collection includes {x=*pc, y=m_02, z=x+y and *pc=z}, whereas the second exemplary collection includes {x=*dpa, y=imm, z=x+y, and *dpa=z}. The third exemplary collection includes {BD=psw.c}, whereas the fourth exemplary collection includes {x=z, y=m_01, z=x+y, and *dpa=z}.

Based on the earlier described collections, the meanings of the first, the second, and the fourth exemplary collections are readily apparent. For the third exemplary collection, POP "BD=psw.c" stands for copying the content of the carry bit of control variable processor status word (psw) into the addressable storage location for storing the branch decision variable BD.

In accordance with the present invention, the first two exemplary collections are organized into two atomic units, and then into a first snippet. Similarly, the third and the fourth exemplary collections are also organized into two atomic units, and then into a second snippet. An execution condition governing the conditional execution of the second atomic unit of the second snippet, i.e. only if BD equals 1, is specified for the second atomic unit. The second snippet is logically associated with the first snippet by specifying a trap request to control logic 104, and pre-defining the trap request to modify the thread offset address to access the second snippet.

Figure 7:
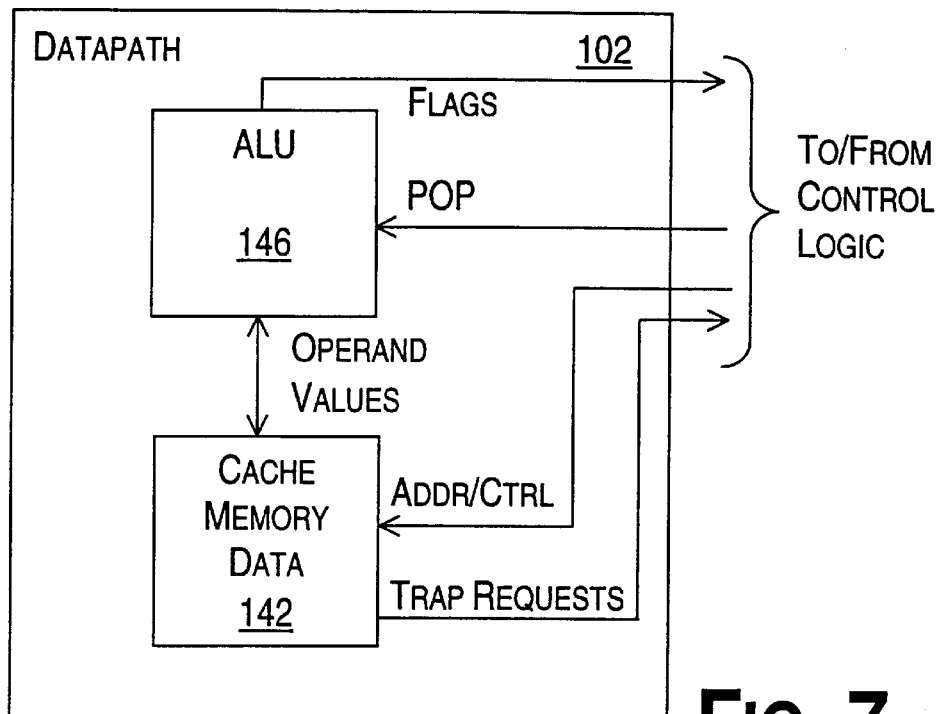
FIGS. 7–8 illustrate one embodiment each of the datapath and the control logic respectively.

FIG. 7 illustrates one embodiment of datapath 102 in more detail. For the illustrated embodiment, datapath 102 includes cache memory 142 and ALU 146, coupled to each other as shown. Cache memory 142 is employed by control logic 104 to directly supply and accept operand values to and from ALU 146. In other words, for the illustrated embodiment, unlike prior art datapaths, datapath 102 does not have physical accumulator or physical register file. ALU 146 is employed to execute hierarchically organized POP of the present invention, using operand values supplied by cache memory 142. ALU 146 may be implemented with any one of a number of circuitry known in the art. Cache memory 142 is described in the above identified incorporated by reference copending U.S. patent application No. <to be assigned>, entitled "Cache Memory Based Instruction Execution", and incorporated by reference copending U.S. patent application No. <to be assigned>, entitled "Virtual Register File".

During operation, control logic 104 selectively provides appropriate ones of the POP and location information of operand values to ALU 146 and cache memory 142 respectively. In response, cache memory 142 outputs the appropriate operand values for ALU 146, which in turn executes the provided POP, operating on the operand values output by cache memory 142. The resulting operand values are stored back into cache memory 142. Additionally, ALU 146 is designed to provide control logic 104 with various system flag values, such as the carry and zero flags described earlier, and cache memory 142 is designed to issue trap requests to control logic 104 as a result of data values being stored into certain pre-selected cache locations, such as the cache location that function as an accumulator, as described earlier. In one embodiment, the word lines of cache memory 142 are employed to issue the trap requests, by providing offsets into the above described trap vector table. The offsets are derived through word line mappings.

While datapath 102 is illustrated with only one ALU 146, those skilled in the art will appreciate that, the present invention may also be practiced with a datapath 102 that includes more ALU, e.g. one that allow the common PC update thread and/or implementing threads of different ISA to be executed in parallel.

Figure 8:
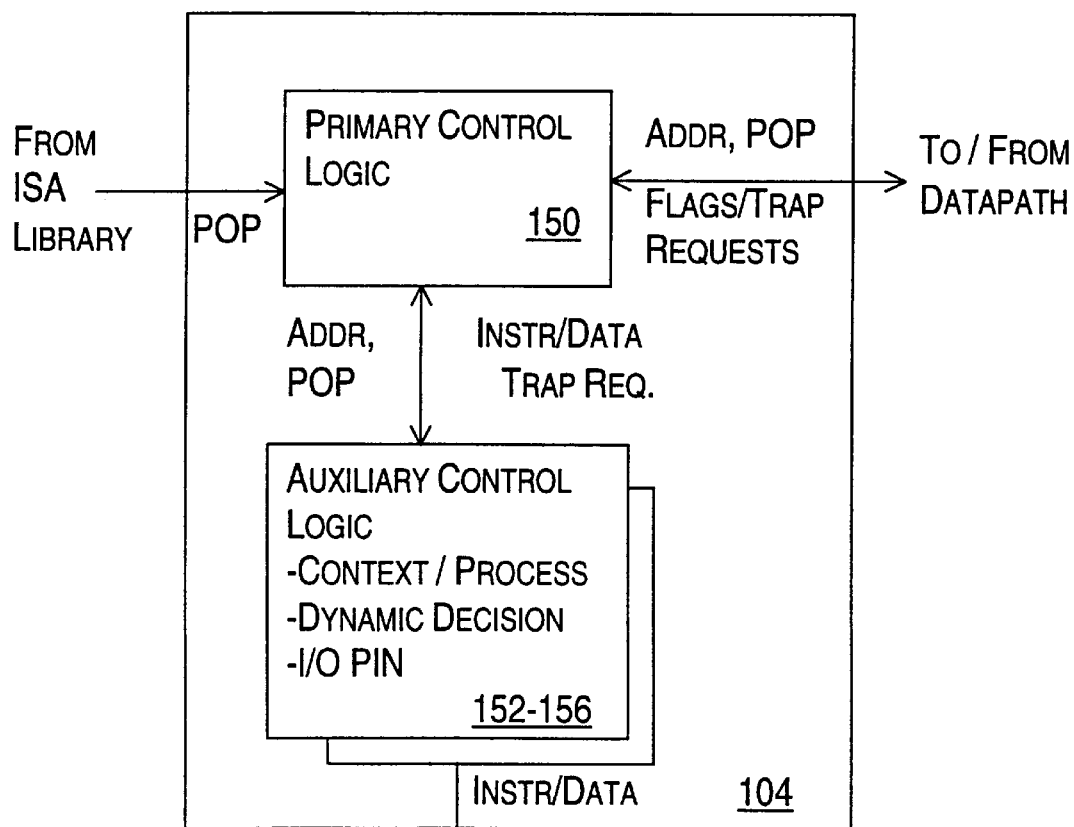

FIG. 8 illustrates one embodiment of control logic 104. For the illustrated embodiment, control logic 104 includes primary control unit (PCU) 150 and a number of auxiliary control units (ACU) 152–156. Specifically, for the illustrated embodiment, ACU 152–156 include a context/process ACU 152, a dynamic decision ACU 154, and an input/output (I/O) pin ACU 156. PCU 150 selectively controls datapath 102 to execute the hierarchically organized POP of the present invention with the assistance of ACU 152–156. Context/process ACU 152 is employed to assist PCU 150 in determining the appropriate state transitions for various contexts and processes. For the illustrated embodiment, the earlier described CCB and PCB for the various contexts and processes are maintained by context/process ACU 152. Dynamic decision ACU 154 is employed to assist PCU 150 in processing a number of dynamic decision variables, as described earlier. For the illustrated embodiment, the dynamic decision variables are maintained in the dynamic decision ACU 154. I/O pin ACU 156 is employed to assist PCU 150 in effectuating data input/output via the I/O pins 106 respectively. In alternate embodiments, more or less ACU may be employed.

Figure 9:
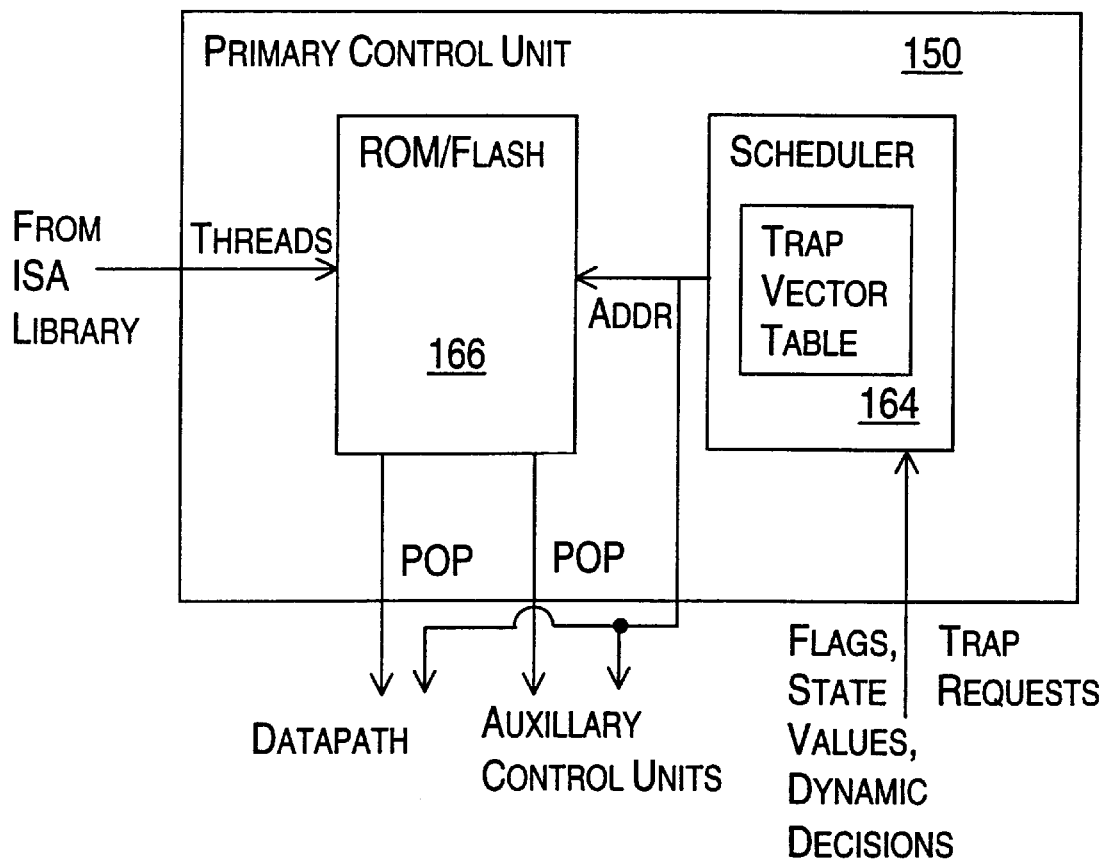
FIGS. 9–12 illustrate one embodiment each of a primary control unit, a context/process auxiliary control unit, a dynamic decision auxiliary control unit and an I/O pin auxiliary control unit respectively.

FIG. 9 illustrates one embodiment of PCU 150 in more detail. For the illustrated embodiment, PCU 150 includes scheduler 164 and memory 166 coupled to each other as shown. Scheduler 164 is employed to schedule selected ones of the snippets of the various threads of POP implementing instructions of an ISA. In addition to scheduling logic, which may be implemented employing any one of a number of approaches known in the art, scheduler 164 includes a trap vector table of trap handler addresses. Additionally, scheduler 164 is configured with the information identifying how many and which ISA are to be retrieved from ISA library 108. The configuration may be achieved in any one of a number of approaches known in the art. Memory 166 is used to pre-stage the implementing threads of an ISA. In one embodiment, memory 166 is partitioned into regions for storing the various implementing threads in accordance with their functions, i.e. implementing instructions, context/process management, dynamic decision making, trap handling, etc. Scheduler 164 and memory 166 may be implemented with any one of a number of circuitry known in the art.

During operation, responsive to instructions of the processes, e.g. user instruction streams, various snippets of the implementing threads are scheduled for execution. Responsive to addresses supplied by scheduler 164, memory 166 outputs the various hierarchically organized POP of the scheduled snippets to selected ones of datapath 102 and auxiliary control units 152–156. Scheduler 164 formulates the appropriate addresses to supply to memory 166 using the base and offset addresses maintained in the CCB and PCB of the various contexts and processes. As execution progresses, when necessary ACU 152–154 assist PCU 150 to examine execution conditions that govern the conditional execution of certain atomic units. Similarly, when necessary, scheduler 164 causes appropriate ones of various hierarchically organized POP to be output from memory 166 for context/process ACU 152 and dynamic decision ACU 154 to assist in determining appropriate state transitions and dynamic decisions respectively. Likewise, responsive to trap requests made to control logic 102, scheduler 164 using the trap handler address information maintained in trap vector table, causes appropriated ones of various hierarchically organized POP of the trap handlers to be output to selected ones of datapath 102 and ACU 152–154 for execution. In particular, selected ones of the trap handlers assist in maintaining the offset addresses in the PCB for successive scheduling of the snippets of the implementing threads. Additionally, as execution progresses, responsive to I/O trap requests, scheduler 164 causes appropriate ones of hierarchically organized POP to be output to I/O pin auxiliary ACU 156 to assist in effectuating data input/output via the I/O pins.

Figure 10:
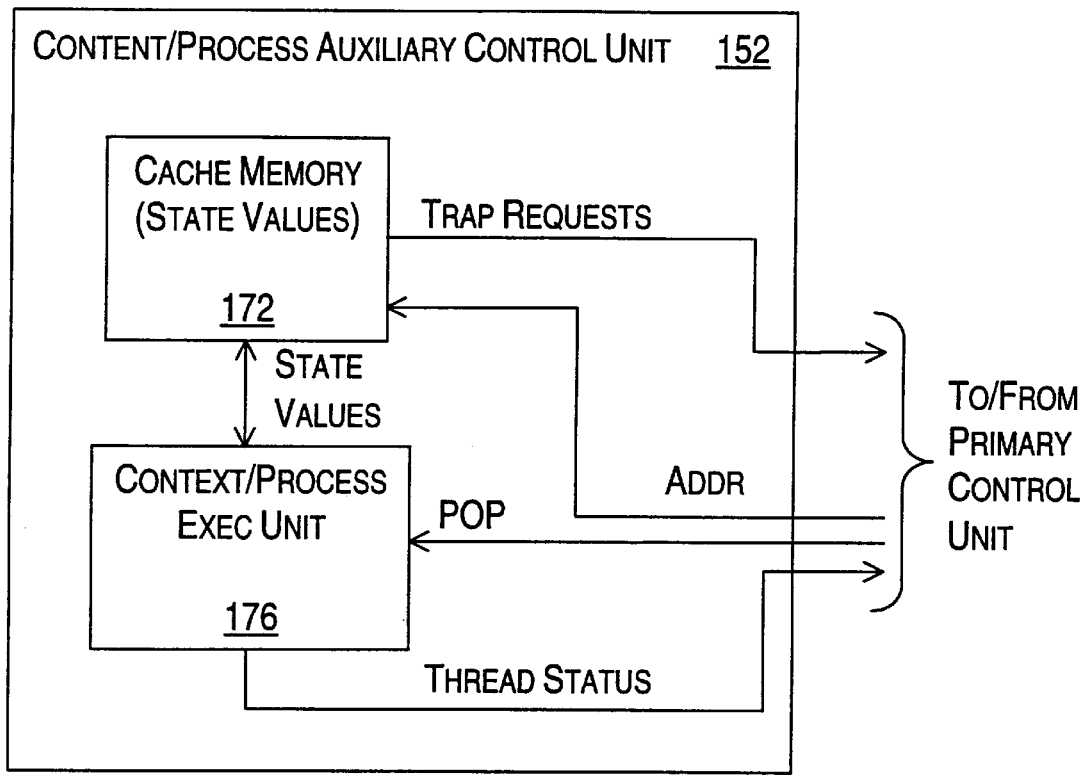

FIG. 10 illustrates one embodiment of context/process ACU 152 in more detail. For the illustrated embodiment, context/process ACU 152 includes cache memory 172 and execution unit 176, coupled to each other as shown. As described earlier, cache memory 172 is employed by control logic 104 to store CCB and PCB of various contexts and processes, and output the various control variables of CCB and PCB for processing by execution unit 176. Execution unit 176 is employed to execute the hierarchically organized POP output using operand values supplied by cache memory 172. Execution unit 176 may be implemented with any one of a number of circuitry known in the art. Cache memory 172 may be implemented in like manner as cache memory 142 of datapath 102. In one embodiment, the earlier described cache memory 142 of datapath 102 and cache memory 172 are implemented using the same physical structure.

During operation, control logic 104 selectively provides appropriate ones of the hierarchically organized POP and location information of control variable/state values to execution unit 176 and cache memory 142 respectively. In response, cache memory 172 outputs the appropriate control variable/state values for execution unit 176, which in turn executes the POP, and process the control vairable/state values output by cache memory 172. The resulting control variable/state values are stored back into cache memory 172. Additionally, execution unit 176 is designed to provide control logic 104 with the states of the various executing thread instances, and cache memory 172 is designed to issue trap requests to control logic 104. The trap requests are issued as a result of state values being stored into certain locations of cache memory 172, such as the cache locations employed to store the reset bits, as described earlier. In one embodiment, the word lines of cache memory 172 are employed to issue the trap requests, by providing offsets into the above described trap vector table. The offsets are derived through word line mappings.

Figure 11:
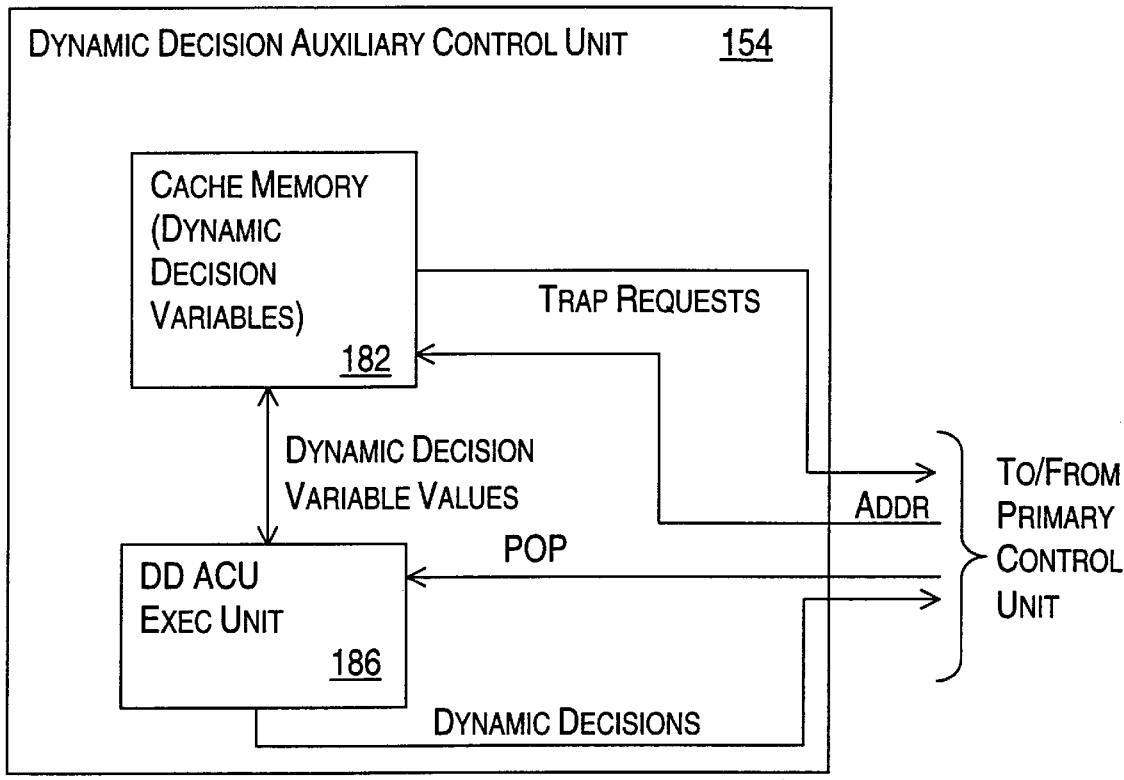

FIG. 11 illustrates one embodiment of dynamic decision ACU 154 in more detail. For the illustrated embodiment, dynamic decision ACU 154 includes cache memory 182 and execution unit 186, coupled to each other as shown. Cache memory 182 is employed by control logic 104 to store and output dynamic decision variable values for execution unit 186. Execution unit 186 is employed to execute hierarchically organized POP, using dynamic decision variable values supplied by cache memory 182. Execution unit 186 may be implemented with any one of a number of circuitry known in the art. Cache memory 182 may be implemented in like manner as cache memory 142 of datapath 102. In one embodiment, the earlier described cache memory 142 of datapath 102, cache memory 172 and cache memory 182 are implemented using the same physical structure.

During operation, control logic 104 selectively provides appropriate ones of the hierarchically organzied and location information of dynamic decision variable values to execution unit 186 and cache memory 182 respectively. In response, cache memory 182 outputs the appropriate dynamic decision variable values for execution unit 186, which in turn executes the hierarchically organized POP, and process the dynamic decision variable values output by cache memory 182. The resulting dynamic decision variable values are stored back into cache memory 182. Additionally, execution unit 186 is designed to provide control logic 104 with the dynamic decisions determined, and cache memory 182 is designed to issue trap requests to control logic 104, such as the cache location employed to store the power control bits, as described earlier. The trap requests are issued as a result of dynamic decision variable values being stored into certain locations of cache memory 182. In one embodiment, the word lines of cache memory 182 are employed to issue the trap requests, by providing offsets into the above described trap vector table. The offsets are derived through word line mappings.

Figure 12:
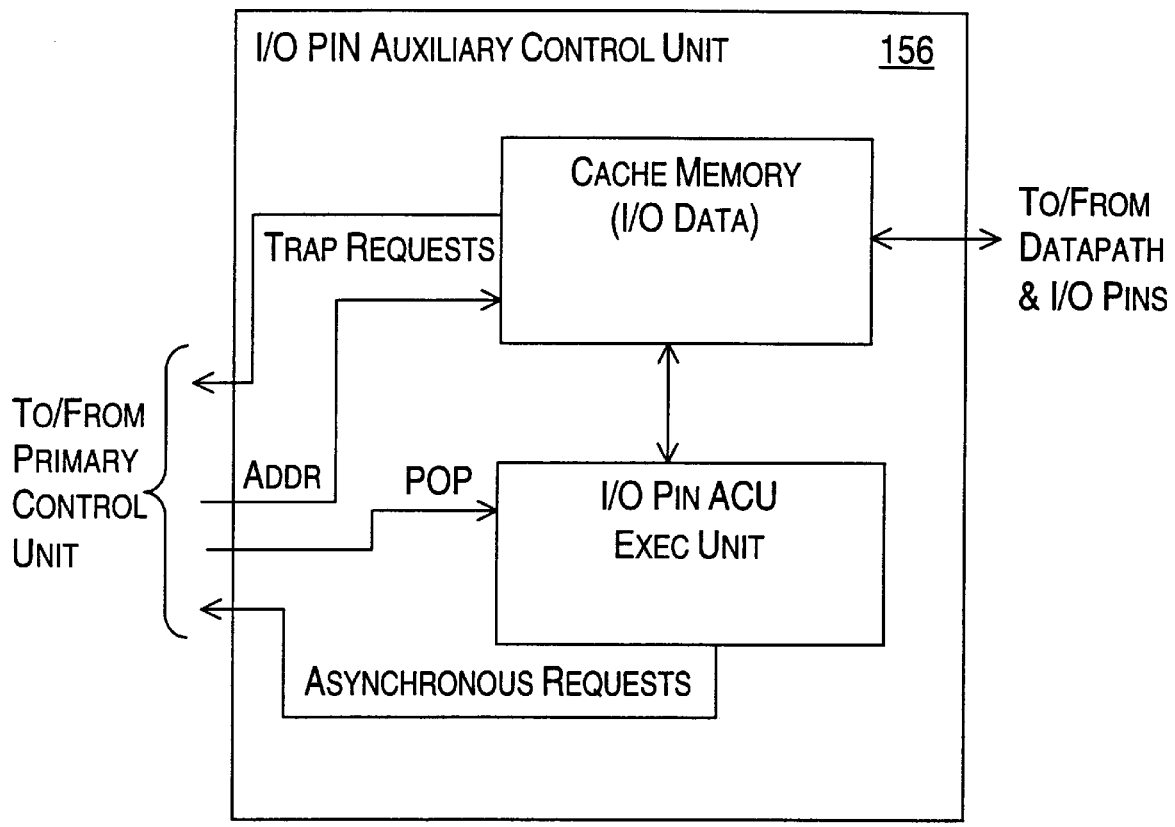

FIG. 12 illustrates one embodiment of I/O pin ACU 156 in more detail. For the illustrated embodiment, I/O ACU 154 is also similarly constituted as the other auxiliary ACU, including cache memory 192 and execution unit 196, coupled to each other as shown. Cache memory 192 is employed by control logic 104 to accept data input values from, and drive data output values to I/O pins 106. Execution unit 196 is employed to execute hierarchically organized POP, and cause cache memory 192 to accept or drive data input/output values. Execution unit 196 may be implemented with any one of a number of circuitry known in the art. Cache memory 192 may be implemented in like manner as cache memory 142 of datapath 102. In one embodiment, the earlier described cache memory 142 of datapath 102, cache memory 172, cache memory 182 and cache memory 192 are all implemented using the same physical structure.

During operation, control logic 104 selectively provides appropriate ones of the hierarchically organized POP and location information of data input/output values to execution unit 196 and cache memory 192 respectively. In response, execution unit 196 causes cache memory 192 to accept data input values from or drive data output values to I/O pins 106. Alternatively, execution unit 196 causes cache memory 192 to accept data output values from cache memory 142 or ALU 146 of datapath 102. Additionally, execution unit 196 is designed to provide control logic 104 with asynchronous requests, and cache memory 192 is designed to issue trap requests to control logic 104. The trap requests are issued as a result of data input/output values being stored into certain locations of cache memory 192. In one embodiment, the word lines of cache memory 192 are employed to issue the trap requests, by providing offsets into the above described trap vector table. The offsets are derived through word line mappings.

I/O pin control is the subject matter of copending U.S. patent application number <to be assigned>, entitled "Adaptable I/O Pin Control", which is filed contemporaneously, and having common assignee as well as inventorship with the present invention. This copending application is also hereby fully incorporated by reference.

The present invention has been described in terms of the above described embodiments for ease of understanding. Those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a more effective approach to implementing an ISA, and controlling the datapath of a processor has been disclosed.

What is claimed is:

1. An apparatus comprising:
   a datapath that operates to execute primitive operations;
   at least one control unit coupled to the datapath that operates to control the datapath to selectively execute a plurality of primitive operations that are hierarchically organized, to effectuate execution of instruction streams constituted with instructions of an ISA, implemented by the hierarchically organized primitive operations, wherein the at least one control unit is equipped to control the datapath to selectively execute the primitive operations, with various ones of the primitive operations being hierarchically organized into at least atomic units, with each atomic unit having one or more independent primitive operations, and wherein the at least one control unit is further equipped to control the datapath to conditionally execute primitive operations of an issued one of the atomic units in accordance with one or more execution conditions governing the conditional execution of the issued atomic unit of primitive operations.

2. The apparatus as set forth in claim 1, wherein the at least one control unit is equipped to process dynamic decision variables, and assess the one or more execution conditions based on the results of said processing of dynamic decision variables.

3. The apparatus as set forth in claim 1, wherein the at least one control unit is further equipped to control the datapath to selectively execute the primitive operations, with the various ones of the atomic units being at least further hierarchically organized into snippets comprising one or more atomic units of primitive operations.

4. The apparatus as set forth in claim 3, wherein the at least one control unit is further equipped to control the datapath to conditionally execute primitive operations of an issued one of the atomic units, in accordance with one or more execution conditions governing the conditional execution of the issued atomic unit of primitive operation, wherein the one or more execution conditions are specified as a part of a snippet to which the issued atomic unit is a member.

5. The apparatus as set forth in claim 3, wherein the at least one control unit is further equipped to control the datapath to selectively execute the primitive operations, with various ones of the snippets being at least further hierarchically organized into execution threads, with each execution thread comprising one or more snippets.

6. The apparatus as set forth in claim 5, wherein the at least one control unit is further equipped to dynamically schedule the snippets of the various execution threads for successive execution by the datapath.

7. The apparatus as set forth in claim 6, wherein the at least one control unit is further equipped to dynamically schedule a first snippet of an execution thread for execution by the datapath following the execution of second snippet of the execution thread by the datapath, responsive to a trap request made to the at least one control unit at the completion of the execution of the second snippet.

8. The apparatus as set forth in claim 1, wherein the at least one control unit is equipped to control the datapath to execute said instruction streams, including instructions of a first process, and instructions of a second process.

9. The apparatus as set forth in claim 8, wherein the at least one control unit is equipped to determine state transitions for the first and second processes.

10. The apparatus as set forth in claim 8, wherein the at least one control unit is equipped to control the datapath to execute said instruction streams, including instructions of processes of a first context, and instructions of processes of a second context.

11. The apparatus as set forth in claim 10, wherein the at least one control unit is equipped to determine state transitions for the first and second contexts.

12. The apparatus as set forth in claim 1, wherein the datapath includes a cache memory and an arithmetic logic unit (ALU) coupled to each other; and the at least one control unit operates to cause the selected ones of the plurality of hierarchically organized primitive operations to be executed by the ALU, with the cache memory directly supplying operand values to the ALU for the selected ones of the hierarchically organized primitive operations, and directly accepting execution results of the executed ones of the plurality of hierarchically organized primitive operations from the ALU.

13. The apparatus as set forth in claim 1, wherein the apparatus further includes an ISA library coupled to the at least one control unit, and having stored therein the plurality of hierarchically organized primitive operations.

14. An apparatus comprising:

a datapath that operates to execute primitive operations;

at least one control unit coupled to the datapath that operates to control the datapath to conditionally execute at least a first issued atomic unit of independent primitive operations to at least partially effectuating execution of an instruction of an instruction set architecture (ISA), where instructions of the ISA are implemented by a plurality of atomic units of independent primitive operations, wherein the at least one control unit is equipped to control the datapath to conditionally execute said first issued atomic unit of independent primitive operations in accordance with one or more execution conditions governing the conditional execution of said first issued atomic unit of independent primitive operations, and wherein the at least one control unit is equipped to process dynamic decision variables, and assess the one or more execution conditions based on the results of said processing of dynamic decision variables.

15. The apparatus as set forth in claim 14, wherein the at least one control unit is further equipped to control the datapath to conditionally execute at least an additional second issued atomic unit of independent primitive operations to further effectuate execution of the instruction.

16. The apparatus as set forth in claim 15, wherein the at least one control unit is equipped to cause the first and second atomic units of independent primitive operations to be issued in order, and conditionally executed by the datapath.

17. An apparatus comprising:

a datapath that operates to execute primitive operations;

at least one control unit coupled to the datapath that operates to control the datapath to execute at least a first snippet of primitive operations to at least partially effectuate execution of an instruction of an instruction set architecture (ISA), where instructions of the ISA are implemented by multiple sequences of logically associated snippets of primitive operations, wherein the at least one control unit is further equipped to control the datapath to execute an additional second snippet of primitive operations that is logically associated with the first snippet of primitive operations, subsequent to the execution of the first snippet of primitive operations, to further effectuate execution of the instruction.

18. The apparatus as set forth in claim 17, wherein the at least one control unit is equipped to dynamically schedule the second snippet for execution by the datapath following the execution of the first snippet by the datapath, responsive to a trap request made to the at least one control unit at the completion of the execution of the first snippet, logically associating the second snippet with the first snippet of primitive operations.

* * * * *